(12) United States Patent
Schulte et al.

(10) Patent No.: US 6,638,379 B1
(45) Date of Patent: Oct. 28, 2003

(54) METHOD AND DEVICE FOR HARDENING BEARING SURFACES OF CRANKSHAFTS

(75) Inventors: Peter Schulte, Wuppertal (DE); Hans-Jürgen Leissner, Remscheid (DE); Waldemar Gezarzick, Remscheid (DE)

(73) Assignee: Elotherm GmbH, Remscheid (DE)

( * ) Notice: Subject to any disclaimer, the term of this patent is extended or adjusted under 35 U.S.C. 154(b) by 0 days.

(21) Appl. No.: 10/031,719
(22) PCT Filed: May 6, 2000
(86) PCT No.: PCT/EP00/04077
§ 371 (c)(1),
(2), (4) Date: Jun. 6, 2002
(87) PCT Pub. No.: WO01/07668
PCT Pub. Date: Feb. 1, 2001

(30) Foreign Application Priority Data

Jul. 22, 1999 (DE) .......................................... 199 34 534

(51) Int. Cl.[7] ................................................. C21D 9/30
(52) U.S. Cl. ........................ 148/572; 148/639; 266/99; 266/129; 266/258; 219/639; 219/652
(58) Field of Search .................. 148/639, 572; 266/124, 90, 99, 129, 258; 219/639, 652

(56) References Cited

U.S. PATENT DOCUMENTS

3,944,446 A    3/1976   Bober

FOREIGN PATENT DOCUMENTS

| DE | 11 74 384 | 7/1964 |
|---|---|---|
| DE | 27 03 750 | 3/1978 |
| JP | 62174329 | 7/1987 |
| JP | 01152221 A | 6/1989 |

*Primary Examiner*—Deborah Yee
(74) *Attorney, Agent, or Firm*—Proskauer Rose LLP

(57) ABSTRACT

This invention relates to a procedure for hardening the bearing surfaces (H1,H2,H3,H4) of a shaft or axle, in particular a crankshaft (2) or camshaft, in which the bearing surfaces (H1–H4) to be hardened are hardened sequentially with the shaft or axle turning around their longitudinal axis (L) by means of a heating and quenching device (3), in which the distortion of the shaft or axle that arises in the area of the respective bearing surface (H1) during the course of hardening is determined, in which the shaft or axle is supported by at least one supporting device (9) during hardening of a bearing surface (H1–H6), which is placed against a previously hardened bearing surface (H1), and in which the setting of the supporting device (9) is regulated taking into account the distortion determined for the bearing surface (H1), against which the supporting device (9) is placed, and a device which enables hardening of crankshafts with a minimal distortion.

16 Claims, 2 Drawing Sheets

METHOD AND DEVICE FOR HARDENING BEARING SURFACES OF CRANKSHAFTS

BACKGROUND OF THE INVENTION

The invention relates to a procedure for hardening the bearing surfaces of a shaft or axle, in particular a crankshaft or camshaft. In addition, the invention relates to a device for hardening the bearing surfaces of shafts or axles that rotate around their longitudinal axis during hardening, in particular of crankshafts and camshafts.

In particular when hardening the bearing surfaces of crankshafts, the problem is that the crankshaft becomes distorted due to the respective locally limited exposure to heat. This distortion becomes particularly evident when hardening a main bearing of the crankshaft.

DE 31 37 398 C1 proposed a procedure and a device of the aforementioned kind, which enable a hardening of crankshafts with a minimal distortion. In this prior art, the distortion that arises during inductive heating of the respective bearing surface is ascertained. To this end, a measuring device is provided, which monitors the lift of the inductor carried on a pendulum bearing that abuts the bearing surface. If the lift is delayed, the heat output of the inductor is increased. By contrast, if a reduction in lift is detected, the heat output is also reduced. At the same time, the crankshaft is clamped on either side of the bearing to be hardened in a collar plate. These support surfaces encompass three rollers sitting on the crankshaft in regular angular intervals, via which the respective support force is exerted on the crankshaft. As a result of the interaction between the support forces exerted by the collar plates and variable heat output, the distortion of the crankshaft that accompanies the hardening is kept to a minimum.

It has been found in practice that, in particular when the surfaces of the lifting and main bearing of a crankshaft are hardened in sequence, the minimization of distortion achieved with the known procedures or known device is insufficient to satisfy the increased requirements placed on the dimensional stability of shafts hardened in this way.

SUMMARY OF THE INVENTION

Proceeding from these problems, the object of the invention is to develop a procedure and a device of the kind described above in which the distortion of a shaft or axle that arises as the bearing surfaces are hardened is further reduced.

On the one hand, this object is achieved with a procedure for hardening the bearing surfaces of a shaft or axle, in particular a crankshaft or camshaft, in which the bearing surfaces to be hardened are hardened sequentially with the shaft or axle turning around their longitudinal axis by means of a heating or quenching device, in which the distortion of the shaft or axle that arises in the area of the respective bearing surface during the course of hardening is determined, in which the shaft or axle is supported by at least one supporting device during hardening, which is placed against a previously hardened bearing surface, and in which the position of the supporting device is regulated taking into account the distortion determined for the bearing surface, against which the supporting device is placed.

On the other hand, the above object is achieved by a device for hardening the bearing surfaces of shafts or axles that rotate around their longitudinal axis during hardening, in particular of crankshafts or camshafts, which is equipped with a heating and quenching device, a supporting device for supporting the shaft or axle during hardening of the bearing surfaces, and with a device for determining the distortion of the respective shaft or axle, wherein a controller with a memory for storing the result of determining the distortion is present, and the supporting device encompasses a setting device linked with the controller, which changes the setting of the supporting device taking into account the stored measured values.

The invention is based on the idea that the distortion that arises when hardening a bearing surface is also taken into account if a supporting device is placed against the respective bearing point to support the shaft or axle while hardening the next bearing surface to be machined. As a result, the setting device is guided as a function of the distortion of the shaft or axle respectively present in the area of the supporting point. In this way, the supporting forces applied by the supporting device can be adjusted to the actual circumstances.

One the one hand, this makes it possible to adjust the supporting forces acting on the shaft or axle in such a way as to avoid undesired additional deformations of the shaft or axle. These deformations can also be caused by motions of the supporting devices that have not been adjusted to the actual circumstances. On the other hand, supporting forces can be exerted on the shaft or axle in a targeted fashion by appropriately controlling the setting of the supporting device, in order to achieve a deformation of the shaft or axle suitable for counterbalancing the distortion.

In this case, the setting of the supporting device is regulated as a function of the rotational setting of the shaft or axle that rotates around its longitudinal axis during the hardening process. In this way, the invention makes it possible to control the support of the machined shaft or axle as a function of rotational angle, while at the same time balancing out those deformations that set in due to the preceding hardenings initiated at another point. By taking into account the deformations that arise during the hardening of the bearing surfaces of a shaft or axle as specified by the invention, distortion of the shaft or axle is minimized after all bearing surfaces have been hardened.

The respective distortion of the individual bearing points taken into account while adjusting the setting of the supporting device can be determined by ascertaining the respective distortion that arises while hardening the bearing surfaces using a pattern shaft or pattern axle, and, while hardening the subsequently machined shafts or axles, regulating the setting of the supporting device placed against a bearing surface of the machined shafts or axles respectively hardened beforehand, taking into account the distortion determined using the pattern shaft for the respectively corresponding bearing surface. In this embodiment of the invention, it is assumed that the same distortion always arises when hardening the bearing points of shafts or axles in a large series of work pieces with identical geometry. For this reason, the distortion that arises when hardening each bearing point is determined using a pattern. Once determined in this way, the distortion is taken into account when regulating the setting of the supporting device during the hardening of all subsequently machined shafts or axles in the same series. The cost for determining distortion can be minimized in this way.

The accuracy with which the arising distortion is counterbalanced can be improved by determining the respective distortion that arises while hardening a bearing surface (H1), by placing the supporting device against the hardened bearing surface after the bearing surface has been hardened in order to support the shaft or axle while hardening the next bearing surface, and by regulating the setting of the supporting device taking into account the distortion determined for the hardened bearing point. In this embodiment of the invention, the respective distortion that actually arises on the individual bearing surfaces is determined for each shaft or axle. This distortion is then taken into account when supporting the shaft or axle while hardening the bearing surface machined next. In this way, all deformations of the shaft or axle that accompany the hardening process are directly counterbalanced, taking into account the actual circumstances existing for each individual work piece.

Regardless of how the distortion is determined, the distortion should be ascertained with respect to its magnitude and relative position, so that the supporting forces applied by the supporting device can be easily controlled depending on the rotational angle according to the invention.

Basically, the distortion can be determined manually after each hardening step using suitable measuring devices. However, it is favorable for automated operation that this distortion of the machined shaft or axle be automatically determined.

One embodiment of the invention that is inexpensive to manufacture and advantageous in terms of space is characterized in that the measuring device is coupled with the heating and quenching device, and a change in the path traversed by the heating or quenching device during a rotation of the shaft or axle is determined as a gauge for the distortion of the shaft or axle. Of course, separate measuring devices independent of the heating and quenching device can also be used, e.g., optical, electrical or other measuring systems, which are suitable for determining the change in a geometric shape or position.

The invention can be used in a particularly advantageous manner in conjunction with those devices in which the heating and quenching device encompasses an inductive heating unit. Precisely these kinds of inductive heating units make it possible to influence the respectively machined work piece with heat.

It is advantageous if the setting device can be moved in at least two degrees of freedom. This makes it possible to compensate for each deformation of the shaft or axle with an appropriate setting of the setting device. In this case, the adjustability of the setting device can be easily realized by virtue of the fact that the setting device encompasses a hydraulically, pneumatically or electrically activatable power-generating device. If this power-generating device encompasses a cylinder, it is beneficial with respect to reducing the space required for an extension of the piston of the cylinder to form a support on which the shaft or axle is supported. A supporting device of this design exhibits a compact structure that can easily be assembled even in more cramped areas.

To enable such a reliable support for the shaft or axle that rotates around its longitudinal axis during the hardening process, the supporting device should exhibit a roller seating for the shaft or axle, wherein the roller seating preferably exhibits two rollers, whose rotational axes are situated in a shared plane. These rollers form a two-point bearing, on which the respective bearing surface is reliably supported when the distance between the rollers is less than the diameter of the shaft or axle in the area of the bearing surface against which the supporting device rests. In this connection, it is also advantageous if a third roller is provided, acting on the bearing surface at a distance from the other two rollers.

In this way, the supporting point can be gripped by the rollers of the supporting device, thereby ensuring a support that encompasses the entire periphery of the respective supporting point.

The latter makes sense in particular when the supporting forces are intended to apply an additional supporting force on the shaft or axle that balances out the existing distortion of the shaft or axle. A configuration of the device according to the invention that is particularly suitable for this purpose is characterized in that at least one of the rollers is hinged and coupled with a setting device, by means of which the hinged roller can be pivoted in its support setting. A supporting device designed in this way can apply both negatively and positively directed supporting forces relative to the desired deformation of the shaft or axle.

BRIEF DESCRIPTION OF THE DRAWINGS

In the following, the invention will be described based on a drawing depicting an embodiment. Diagrammatically shown on.

DETAILED DESCRIPTION OF THE INVENTION

Figure 1:
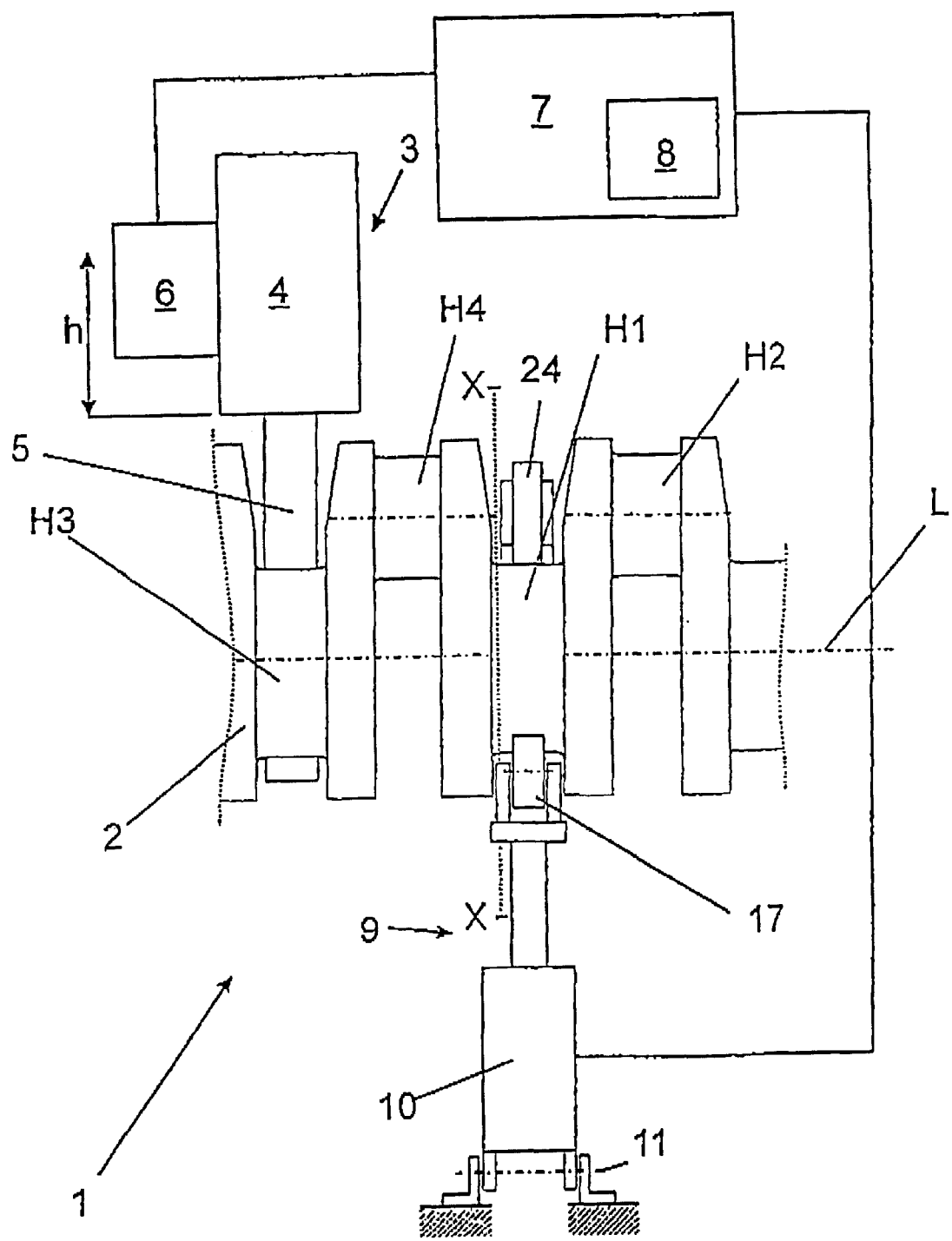
FIG. 1 is a device for hardening a crankshaft, sectional side view.
Figure 2:
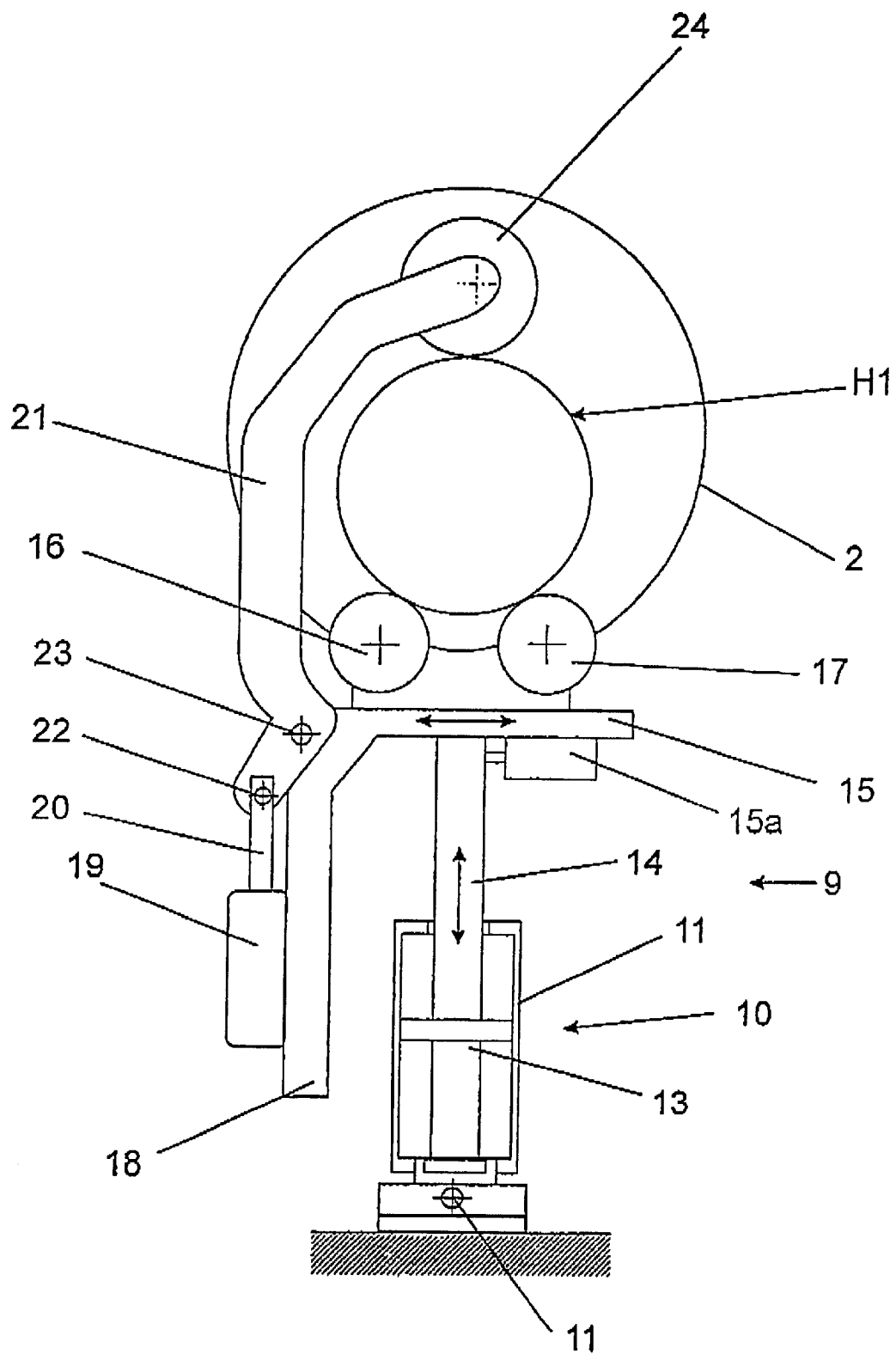
FIG. 2 is the device according to FIG. 1 in a section along the X—X line on FIG. 1.

The device 1 for hardening a crankshaft 2 held in a clamping device (not shown) encompasses a heating and quenching device 3. This heating and quenching device 3 has a transformer 4 and an inductor 5 supplied by the transformer. In addition, a sprayer (not shown here) is provided in the area of the inductor 5, and can be used to spray a quenching liquid on the crankshaft 2.

Inductor branches (not shown) of the inductor 5 envelop the respective bearing surface to be hardened in the form of a half-shell. At the same time, it, along with the transformer 4, the sprayer (not shown) and additional structural units (also not shown) needed to supply the inductor 5 and sprayer, is carried on a pendulum bearing on a framework (also not shown), so that the movements of the crankshaft can be traced during the hardening process.

A measuring device 6 is mechanically, magnetically, electrically or optically coupled with the movements of the inductor 5. The measuring device 6 determines the progression of the lifting motion h executed by the inductor 5 while the crankshaft 2 rotates around its longitudinal axis L. A controller 7 connected with the measuring device 6 receives the measuring signals acquired by the measuring device, and stores them in a data memory 8.

In addition, the device 1 is equipped with a supporting device 9. This supporting device 9 encompasses a setting device 10, which consists of a hydraulically or pneumatically activated cylinder 12 pivoted in a fixed bearing 11. The piston 13 of the cylinder 12, which can be linearly moved to and fro, is extended into a supporting rod 14, and its free end allocated to the crankshaft 2 carries a plate 15. A second, also hydraulically or pneumatically activated setting device 15a can be used to move the plate 15 in a direction perpendicular to the lifting motion of the piston 13, so that the setting of the supporting device 9 relative to the bearing surface H1, H2, H3, H4 of the crankshaft 2 to be hardened can be adjusted in two degrees of freedom.

The support rollers 16, 17 are situated a distance apart from each other on the plate 15. The rotational axes of the support rollers 16, 17 here lie in a shared plane extending parallel to the plate 15. The distance between the rotational axes is also smaller than the largest diameter of the bearing surfaces H1, H2, H3, H4 of the crankshaft 2 to be hardened, so that the respective bearing surface H1–H4 simultaneously sits on the support rollers 16, 17.

Molded onto one of the longitudinal sides of the plate 15 is a shoulder 18 projecting at a right angle from the plate, which carries a second setting device 19 designed as a setting cylinder. The free end of the piston rod 20 of the setting device 19 is linked with an arm 21 via a joint 22.

The arm 21 is pivoted to the plate 15 by means of a second joint 23, which is situated a distance from the first joint 22, and its free end carries a third support roller 24. In this case, the shape of the arm 21 is curved in such a way that the support roller 24 lies on the side of the respective bearing surface H1–H4 opposite the rollers 16, 17 with the arm 21 swiveled in the direction of the crankshaft 2.

For example, to harden the bearing surface H1 of one of the lifting bearings of the crankshaft 2, the heating and quenching device 1 is lowered until the inductor 5 envelops the bearing surface H1 with its inductor branches (not shown), via which an electromagnetic field is induced to heat the respective bearing surface H1. The crankshaft 2 is then made to rotate around its longitudinal axis L. At the same time, the inductor 5 and the structural elements of the heating and quenching device 3 connected thereto execute an oscillating stroke motion h. The progression of this stroke motion h is tracked by the measuring device 6, and stored in the data memory 8 of the controller 9. The distortion of the crankshaft 2 caused by hardening is determined by magnitude and relative position based on the changes in stroke motion h that arise during the course of hardening.

After hardening of the bearing surface H1 is complete, the inductor 5 is lifted and moved to the bearing surface H3 of a main bearing of the crankshaft 2 to be hardened in the next step. At the same time, the supporting device 9 is advanced to the previously hardened bearing surface H1 with the supporting roller 24 swiveled out of the way until the bearing surface H1 sits on the support rollers 16, 17. The support roller 24 is then placed on the bearing surface H1 too by swiveling the arm 21, so that the respective lifting bearing is clamped between the support rollers 16, 17 and 24 in a manner resembling a three-point bearing.

During the hardening of the bearing surface H3, the supporting device 9 supports the crankshaft 2 against the bearing surface H1. In this case, the setting of the support rollers 16, 17, 24 and, concurrently, the respectively applied supporting force is regulated via the setting cylinder 12 of the setting device 10 based on the measuring results stored in the controller 7 that represent the distortion of the crankshaft.

| KEY | |
|---|---|
| 1 | Hardening device |
| 2 | Crankshaft |
| 3 | Heating and quenching device |
| 4 | Transformer |
| 5 | Inductor |
| 6 | Measuring device |
| 7 | Controller |
| 8 | Data memory |
| 9 | Supporting device |
| 10 | Setting device |
| 11 | Bearing |
| 12 | Cylinder |
| 13 | Piston |
| 14 | Supporting rod |
| 15 | Plate |
| 15a | Second setting device |
| 16, 17 | Support rollers |
| 18 | Shoulder |
| 19 | Setting device |
| 20 | Piston rod of setting device 19 |
| 21 | Arm |
| 22 | Joint |
| 23 | Joint |
| 24 | Support roller |
| L | Longitudinal axis |
| h | Stroke motion |
| H1, H2, H3, H4 | Bearing surfaces |

What is claimed is:

1. A procedure for hardening the bearing surfaces (H1, H2, H3, H4) of a shaft or axle, in particular a crankshaft (2) or camshaft,
    in which the bearing surfaces (H1–H4) to be hardened are hardened sequentially as the shaft or axle rotates by means of a heating and quenching device (3);
    in which the distortion of the shaft or axle that arises during the course of hardening is determined in the area of the respective bearing surface (H1);
    in which the shaft or axle is supported by at least one supporting device (9) during the hardening of a bearing surface (H1–H6), which is placed against a bearing surface (H1) hardened beforehand, and
    in which the setting of the supporting device (9) is regulated taking into account the distortion determined for the bearing surface (H1) against which the supporting device (9) is placed.

2. A procedure according to claim 1, characterized in that the magnitude and angular position of the distortion are determined.

3. A procedure according to claim 1, characterized in that:
    the distortion that arises during the hardening of the bearing surfaces is determined using a pattern shaft or pattern axle, and that,
        while hardening the subsequently machined shafts or axles, the setting of the supporting device (9) placed against a bearing surface (H1) of the machined shafts or axles respectively hardened beforehand is regulated taking into account the distortion determined using the pattern shaft for the respectively corresponding bearing surface.

4. A procedure according to claim 1, characterized in that:
    the respective distortion that arises during the hardening of a bearing surface (H1) is determined that,
        after the bearing surface (H1) has been hardened, the supporting device is placed against this hardened bearing surface (H1), in order to support the shaft or axle (2) while hardening the next bearing surface (H3), and that
        the setting of the supporting device is regulated taking into account the distortion determined for the hardened bearing point (H1).

5. A device for hardening the bearing surfaces (H1–H4) of shafts or axles that rotate around their longitudinal axis (L) during hardening, in particular of crankshafts (2) or camshafts, with a heating and quenching device (3), with a supporting device (9) for supporting the shaft or axle (2) during the hardening of the bearing surfaces (H1–H4), and with a device (6) for determining the distortion of the respective shaft or axle, characterized in that:

a controller (7) with a memory (8) for storing the result obtained from determining the distortion is present, and that the supporting device (9) encompasses a setting device (10) linked with the controller (7), which changes the setting of the supporting device (9) taking into account the stored measured values.

6. A device according to claim 5, characterized in that the device for detecting the distortion is an automatic measuring device (6).

7. A device according to claim 6, characterized in that the measuring device (6) is coupled with the heating and quenching device (3), and detects a change in the path traversed by the heating and quenching device (3) during a rotation of the crankshaft (2) as a gauge for the distortion of the crankshaft (2).

8. A device according to claim 5, characterized in that the heating and quenching device (3) encompasses an inductive heating unit (5).

9. A device according to claim 5, characterized in that the setting device (3) can be moved in at least two degrees of freedom.

10. A device according to claim 5, characterized in that the setting device (3) encompasses a hydrolytic, pneumatic or electric power-generating device (12).

11. A device according to claim 10, characterized in that the power generating device is a hydraulic or pneumatic cylinder (12), and that an extension of the piston (13) of the cylinder (12) forms a support (14) on which the crankshaft (2) is supported.

12. A device according to claim 5, characterized in that the supporting device (9) has a roller seating for the crankshaft (2).

13. A device according to claim 12, characterized in that he roller seating has two rollers (16, 17), whose rotational axes are situated in a shared plane.

14. A device according to claim 13, characterized in that the distance between the rollers (16, 17) is less than the diameter of the crankshaft (2) in the area of the bearing surface against which the supporting device (9) rests.

15. A device according to claim 12, characterized in that a third roller (24) is provided, acting on the bearing surface (H1–H4) at a distance from the other rollers (16, 17).

16. A device according to claim 12, characterized in that at least one of the rollers (16, 17, 24) is pivoted and coupled with a setting device (19), by means of which the hinged roller (24) can be pivoted in its support setting.

\* \* \* \* \*